US012172277B2

(12) United States Patent
Freiburger

(10) Patent No.: US 12,172,277 B2
(45) Date of Patent: Dec. 24, 2024

(54) DRIVING APPARATUS, CARTRIDGE STRIPS, AND FASTENING SYSTEM

(71) Applicant: Hilti Aktiengesellschaft, Schaan (LI)

(72) Inventor: Jan Freiburger, Augsburg (GR)

(73) Assignee: Hilti Aktiengesellschaft, Schaan (LI)

( * ) Notice: Subject to any disclaimer, the term of this patent is extended or adjusted under 35 U.S.C. 154(b) by 519 days.

(21) Appl. No.: 15/742,253

(22) PCT Filed: Jul. 20, 2016

(86) PCT No.: PCT/EP2016/067317
§ 371 (c)(1),
(2) Date: Jan. 5, 2018

(87) PCT Pub. No.: WO2017/021157
PCT Pub. Date: Feb. 9, 2017

(65) Prior Publication Data

US 2018/0193991 A1 Jul. 12, 2018

(30) Foreign Application Priority Data

Jul. 31, 2015 (EP) .................................... 15179306
Dec. 23, 2015 (EP) .................................... 15202247

(51) Int. Cl.
*B25C 1/18* (2006.01)
*B25C 1/16* (2006.01)

(52) U.S. Cl.
CPC .............. *B25C 1/186* (2013.01); *B25C 1/163* (2013.01)

(58) Field of Classification Search
CPC ........... B25C 1/08; B25C 1/082; B25C 1/163; B25C 1/186
See application file for complete search history.

(56) References Cited

U.S. PATENT DOCUMENTS 4,560,061 A * 12/1985 Haytayan ................ B25C 1/163 102/281
4,920,885 A 5/1990 Bowman
(Continued)

FOREIGN PATENT DOCUMENTS

CN 1496789 A 5/2004
CN 101093155 A 12/2007
(Continued)

OTHER PUBLICATIONS

International Bureau, International Search Report in International Application No. PCT/EP2016/067317, mailed Feb. 9, 2017.

*Primary Examiner* — Daniel Jeremy Leeds
(74) *Attorney, Agent, or Firm* — Leydig, Voit & Mayer, Ltd.

(57) ABSTRACT

A device for driving fastening elements into a substrate, having a combustion chamber in which a fuel can be burned for the purposes of transmitting energy to a fastening element, having a cartridge bearing which has a receiving chamber for a cartridge which contains the fuel, which receiving chamber is open in an opening direction toward the combustion chamber, having a closure which, in a closed position of the closure, closes the receiving chamber counter to the opening direction and bears against the cartridge bearing, and having a strip leadthrough, which defines a transport direction and opens into the receiving chamber, for a cartridge strip which bears the cartridge.

9 Claims, 5 Drawing Sheets

(56) References Cited

U.S. PATENT DOCUMENTS

| | | | | |
|---|---|---|---|---|
| 5,279,201 | A | 1/1994 | Hans et al. | |
| 5,492,065 | A | 2/1996 | Hans et al. | |
| 6,062,455 | A * | 5/2000 | Giannuzzi | B25C 1/163 227/10 |
| 6,276,253 | B1 * | 8/2001 | Sprenger | B25C 1/163 89/35.01 |
| 6,286,743 | B1 | 9/2001 | Ehmig | |
| 6,981,630 | B2 | 1/2006 | Popovich et al. | |
| 7,048,166 | B2 | 5/2006 | Pfister et al. | |
| 7,096,577 | B2 | 8/2006 | McCullough | |
| 7,690,290 | B2 * | 4/2010 | Oehri | B25C 1/163 102/281 |
| 2001/0002572 | A1 | 6/2001 | Ehmig | |
| 2005/0035172 | A1 | 2/2005 | Popovich et al. | |
| 2005/0189391 | A1 | 9/2005 | Norbert et al. | |
| 2008/0006143 | A1 | 1/2008 | Schneider et al. | |

FOREIGN PATENT DOCUMENTS

| | | | |
|---|---|---|---|
| CN | 100400240 | C | 7/2008 |
| DE | 4301967 | A1 | 7/1994 |
| DE | 19905896 | A1 | 8/2000 |
| DE | 20318884 | U1 | 3/2004 |
| DE | 102006000241 | A1 | 11/2007 |
| EP | 0525613 | A1 | 2/1993 |
| EP | 1013382 | A1 | 6/2000 |
| EP | 1 400 314 | A | 3/2004 |
| EP | 1400315 | A1 | 3/2004 |
| FR | 2863924 | A1 | 6/2005 |
| GB | 2146746 | A | 6/1985 |
| SU | 388428 | A3 | 6/1973 |
| TW | 237734 | Y | 1/1995 |
| TW | 200420388 | A | 10/2004 |
| TW | I230111 | B | 4/2005 |

* cited by examiner

DRIVING APPARATUS, CARTRIDGE STRIPS, AND FASTENING SYSTEM

CROSS-REFERENCE TO RELATED APPLICATIONS

This patent application is the U.S. National Stage of International Patent Application No. PCT/EP2016/067317, filed Jul. 20, 2016, which claims the benefit of European Patent Application No. 15179306.4, filed Jul. 31, 2015, and European Patent Application No. 15202247.1, filed Dec. 23, 2015.

The invention relates to an apparatus for driving fastening elements into a substrate, to cartridge strips for a driving apparatus, and to a fastening system having a driving apparatus and a cartridge strip.

BACKGROUND OF THE INVENTION

Known driving apparatuses are used, for example, as powder-actuated bolt guns, typically comprising a combustion chamber in which a fuel, which is usually designed as a solid propellant charge, can be combusted to transfer energy to a fastening element, and comprising a cartridge holder and a closure. The cartridge holder has a receiving chamber which is open in an opening direction, to the combustion chamber, for a cartridge containing the fuel, such that a cartridge received in the receiving chamber can open towards the combustion chamber as soon as the cartridge is ignited. During such an ignition, the closure, when in a closed position, bounds the receiving chamber so that the cartridge is supported perpendicular to the opening direction by the cartridge holder and counter to the opening direction by the closure. This chambering is intended to ensure that the cartridge only opens towards the combustion chamber during ignition.

In addition, the cartridges are often magazined in a cartridge strip, and are gradually fed to the receiving chamber along a strip passage. However, the chambering of a cartridge in the receiving chamber is incomplete, since in the region of the closure a support of the cartridge perpendicular to the opening direction is missing. If the cartridge strip, which is usually made of plastic, does not withstand the combustion pressure during ignition of the cartridge, there is the risk that the cartridge will burst open in the region of the strip passage—that is, at its end pointing opposite the opening direction, and will discharge there. In order to minimize this risk, known driving apparatuses and cartridges are designed for a limited combustion pressure.

BRIEF SUMMARY OF THE INVENTION

The problem addressed by the invention is that of providing a driving apparatus and a cartridge strip with which high combustion pressures can be achieved, without increasing the risk of undesired cartridge bursting.

According to a first aspect of the invention, an apparatus for driving fastening elements into a substrate comprises a combustion chamber in which a fuel can be burned to transmit energy to a fastening element, a cartridge holder which has a receiving chamber, which is open to the combustion chamber in an opening direction, for the fuel cartridge, a closure which, in a closed position of the closure, bounds the receiving chamber in the direction opposite the opening direction, and a strip passage which defines a transport direction and which opens into the receiving chamber, for a cartridge strip carrying the cartridge, wherein the closure rests on the cartridge holder when in the closed position.

According to a preferred embodiment, the receiving chamber is open only to the combustion chamber and to the strip passage, and otherwise is surrounded by the cartridge holder and the closure.

According to a preferred embodiment, in the closed position of the closure, the closure projects into a recess of the cartridge holder which forms the receiving chamber.

According to a preferred embodiment, the cartridge holder has a chamfer as a counter contour for a tapered insertion surface of the cartridge strip. The chamfer is preferably annular. Particularly preferably, the chamfer is frustoconical. Also preferably, the chamfer extends to an edge of the receiving chamber.

According to a preferred embodiment, the receiving chamber, viewed in the opening direction, has a partially circular circumference at the level of the chamfer and/or at the level of the boundary formed by the closure.

According to a preferred embodiment, the cartridge strip can be supported, by the closure, in the closed position of the closure, perpendicular to the opening direction and perpendicular to the transport direction.

According to a preferred embodiment, a cartridge arranged in the receiving chamber can be supported perpendicular to the opening direction of the cartridge holder and/or the closure, in the closed position of the closure, on its entire length, as measured in the opening direction, directly or indirectly via a carrier strip of the cartridge strip. Particularly preferably, the cartridge is supported there only by the cartridge holder.

An embodiment of the apparatus is characterized in that the cartridge is supported, perpendicular to the opening direction and perpendicular to the transport direction, by the closure at its rear end facing opposite the opening direction. Preferably, the closure has a support projection on which the cartridge can be supported.

An embodiment of the apparatus is characterized in that the cartridge can be supported on its entire width, measured in the transport direction, perpendicular to the opening direction and perpendicular to the transport direction of the closure.

An embodiment of the apparatus is characterized in that the cartridge can be supported in the transport direction by the closure, preferably on its entire depth as measured perpendicular to the opening direction and perpendicular to the transport direction.

An embodiment of the apparatus is characterized in that the closure has a firing pin guide which, in the closed position of the closure, opens into the receiving chamber, and in said firing pin guide, a firing pin can be moved toward the receiving chamber to ignite a cartridge optionally arranged in the receiving chamber.

An embodiment of the apparatus is characterized in that the closure has a support surface for supporting the cartridge perpendicular to the opening direction. Preferably, the support surface has the shape of a truncated cone which is particularly preferably fully circular.

An embodiment of the apparatus is characterized in that the apparatus comprises a contact sensor which conveys a cartridge of a cartridge strip along the strip passage, in the transport direction, into the receiving chamber when the apparatus is pressed against a substrate and/or when a driving operation is completed. Preferably, the contact sensor comprises a transport pawl for conveying the cartridge into the receiving chamber.

An embodiment of the apparatus is characterized in that the carrier strip has, on its rear side facing the opening direction, a rear-side strip recess, which is arranged, as seen from the cartridge, in a direction perpendicular to the opening direction and perpendicular to the transport direction.

According to a further aspect of the invention, a cartridge strip for a driving apparatus comprises a cartridge containing a fuel, and comprises a carrier strip which supports the cartridge and defines a transport direction, wherein the carrier strip has a cartridge holder which defines an opening direction, and the cartridge is held in said cartridge holder in such a manner that the cartridge can open in the opening direction when the fuel is ignited, wherein the carrier strip has a tapered insertion surface on its front side which faces in the opening direction. The tapered insertion surface preferably has a straight contour in cross-section. In likewise preferred embodiments, the tapered insertion surface has a curved contour in a cross-section. Particularly preferably, the contour is concavely curved. Alternatively, the contour is convexly curved.

According to a preferred embodiment, the carrier strip has a strip section, which is functionally assigned to the cartridge, with a partially circular circumference as seen in the opening direction.

According to a preferred embodiment, the strip section has a transport projection which protrudes beyond the rest of the circular shape of the strip section, perpendicular to the opening direction, but which does not protrude beyond the rest of the circular shape of the strip section perpendicular to the transport direction. The circumference of the strip section preferably deviates from the circular shape only in the region of the transport projection, and optionally in the region of a transition to an adjacent further strip section. Particularly preferably, the tapered insertion surface extends up to the transport projection.

According to a preferred embodiment, the tapered insertion surface is annular. The tapered insertion surface is preferably frustoconical. Also preferably, the tapered insertion surface extends to an edge of the cartridge strip.

An embodiment of the cartridge strip is characterized in that the carrier strip has a front-side strip recess on its front side facing into the opening direction and/or has a rear-side strip recess on its rear side facing into the opening direction, which is arranged in a direction perpendicular to the opening direction as viewed from the position of the cartridge, and which individually or jointly extend along the opening direction at least from one front end of the cartridge holder facing into the opening direction up to a rear end of the cartridge facing in a direction opposite to the opening direction.

An embodiment of the cartridge strip is characterized in that the carrier strip has a web which is arranged between the cartridge holder and the rear-side strip recess. The web preferably separates the cartridge holder from the rear-side strip recess. According to a preferred embodiment, the web is aligned with a cartridge base of the cartridge.

An embodiment of the cartridge strip is characterized in that the rear-side strip recess is arranged only on the rear side of the carrier strip. Preferably, the rear-side strip recess is formed as a depression.

An embodiment of the cartridge strip is characterized in that the rear-side strip recess extends in the transport direction along the entire width of the cartridge as measured in the transport direction.

An embodiment of the cartridge strip is characterized in that the rear-side strip recess extends along the cartridge in a direction perpendicular to the opening direction and perpendicular to the transport direction. The rear-side strip recess preferably extends along the entire depth of the cartridge as measured perpendicular to the opening direction and perpendicular to the transport direction.

An embodiment of the cartridge strip is characterized in that the rear-side strip recess has a support surface to provide support on a closure of the driving apparatus. Preferably, the support surface has the shape of a truncated cone which is particularly preferably fully circular.

An embodiment of the cartridge strip is characterized in that the carrier strip has transport projections via which the cartridge strip can be conveyed by a transport device of the driving apparatus, preferably a transport pawl of the transport device, through a strip passage of the driving apparatus.

The carrier strip is preferably made of a plastic. The cartridge, and particularly a cartridge wall of the cartridge, are preferably made of a metal or an alloy, or alternatively are made of a plastic. The cartridge holder and/or the closure are preferably made of a metal or an alloy.

According to a further aspect of the invention, a fastening system comprises an apparatus according to the invention, for driving fastening elements into a substrate, and also a cartridge strip according to the invention.

According to a preferred embodiment, the chamfer of the cartridge holder and the tapered insertion surface of the cartridge strip have the same shape and abut each other when the cartridge is arranged in the receiving chamber.

According to a preferred embodiment, the cartridge strip completely fills the receiving chamber, and the cartridge is supported on all sides, in the closed position of the closure, except toward the combustion chamber, when the cartridge is arranged in the receiving chamber.

According to a further aspect of the invention, the support strip has a depression on its front side facing into the opening direction, running around the cartridge holder and completely surrounding the cartridge holder. This enables an improved support of the cartridge transverse to the opening direction. Preferably, the depression has the shape of a circular ring.

According to a preferred embodiment, the depression is formed as a groove. Preferably, the depression is formed as a groove over the entire circumference around the cartridge holder.

According to a preferred embodiment, the depression, and the depression which is functionally assigned to an adjacent cartridge holder, are connected to one another in such a way that they form a common depression. Preferably, the common depression has the shape of the numeral "8."

According to a preferred embodiment, the depression, and the depression which is functionally assigned to an adjacent cartridge holder, are completely separated from each other. The carrier strip preferably has a separating ridge which separates the mutually adjacent depressions from one another.

According to a preferred embodiment, the cartridge holder engages into the depression of the cartridge strip when the cartridge is arranged in the receiving chamber. Preferably, the cartridge holder completely fills the space of the depression of the cartridge strip when the cartridge is arranged in the receiving chamber.

BRIEF DESCRIPTION OF THE SEVERAL VIEWS OF THE DRAWING(S)

Preferred embodiments are explained in greater detail below, with reference to the drawings, wherein.

DETAILED DESCRIPTION OF THE INVENTION

Figure 1:
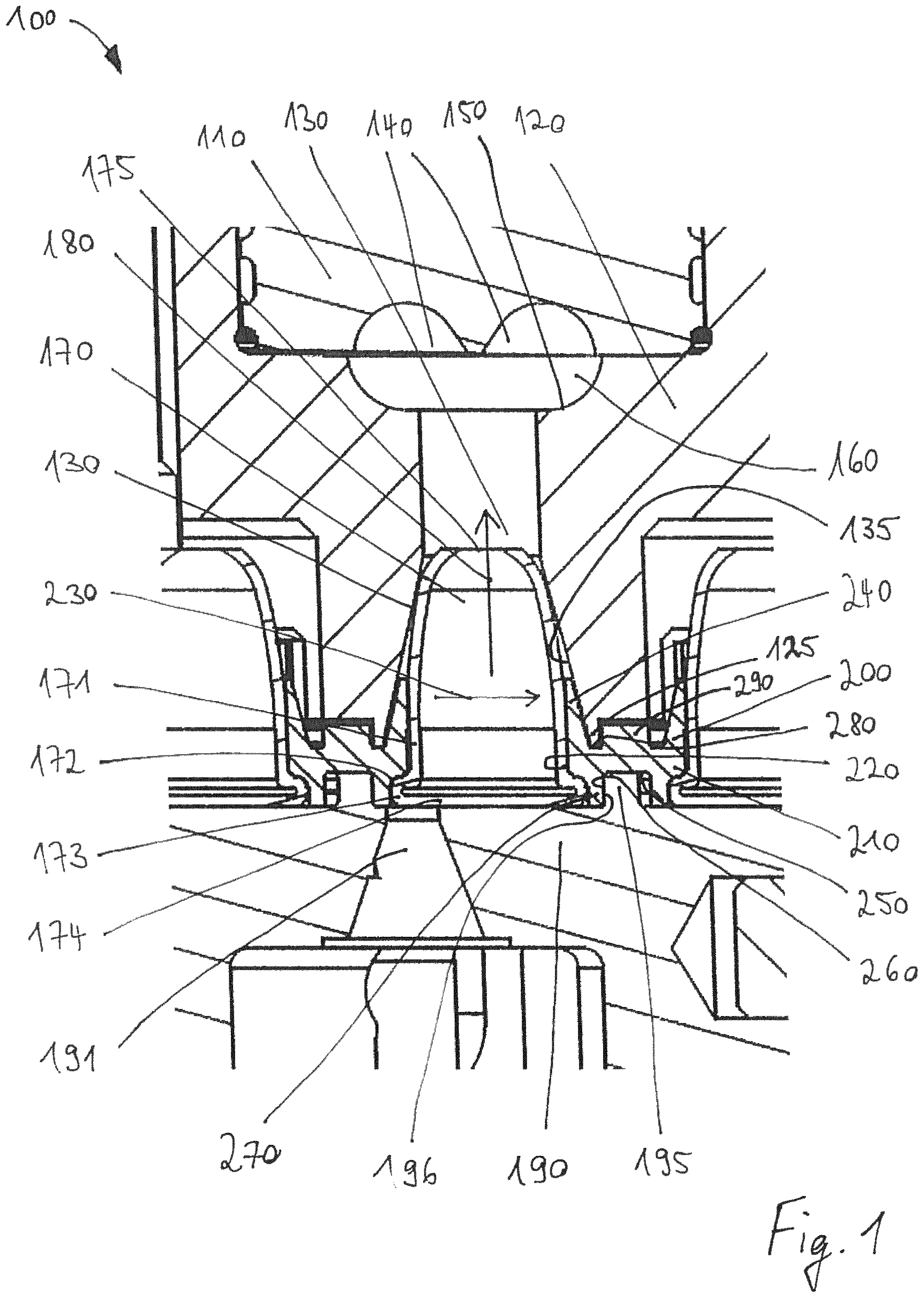
FIG. 1 shows a part of a driving apparatus in a longitudinal section.

FIG. 1 illustrates a longitudinal section of a part of a driving apparatus 100 for driving fastening elements (not shown) into a substrate (not shown). The fastening elements are, for example, nails, pins, bolts, rivets and/or pins, which are driven into a flat or uneven substrate made of metal, an alloy such as steel, concrete, wood or the like. For this purpose, a preferably piston-shaped driving element 110 is moved towards a fastening element arranged in an element guide (not shown), which has previously been fed to the element guide by a magazine (not shown), or individually by a user of the driving apparatus 100.

The driving apparatus 100 has a cartridge holder 120 with a receiving chamber 130 for a cartridge 170. The driving element 110 is arranged in its starting position—that is, before a driving operation—opposite the cartridge holder 120, particularly lying against the cartridge holder 120, and has a preferably circular or annular recess 140 on its end facing the cartridge holder 120. The cartridge holder 120 in turn has a preferably cup-shaped recess 150 in its surface facing the driving element 110, arranged in the starting position of the driving element opposite the recess 140, and forming, together with the recess 140 and an optional gap between the driving element 110 and the cartridge holder 120, a combustion chamber 160. In the combustion chamber 160, a fuel can be burned to accelerate the driving element 110 and thus to transfer energy to a fastening element. In embodiments which are not shown, the combustion chamber is formed only by a recess in the driving element, or only by a depression in the cartridge holder—in each case particularly together with an optionally present gap between the driving element and the cartridge holder. During the driving operation, the driving element 110 leaves the region shown in FIG. 1 (upwards, in FIG. 1), such that the driving element is arranged in its driving position—that is, immediately after the driving operation, outside of the region shown in FIG. 1.

The fuel, which is not shown in detail, is preferably solid, more preferably in powder form, and is furnished by the cartridge 170 in which it is arranged. The cartridge 170 itself is received in the receiving chamber 130 and particularly contacts a wall section 135 of the receiving chamber 130 along the circumference of the same. In this case, the wall section 135 has the shape of a funnel or truncated cone tapering toward the combustion chamber 160, and the receiving chamber 130 is open toward the combustion chamber 160 so that the fuel, in the event of ignition, can expand toward the combustion chamber 160 from the cartridge 170, opening in an opening direction 180, and can generate combustion pressure 160 in the combustion chamber, thereby finally accelerating the driving element 110 against the fastening element (not shown).

The cartridge 170 is part of a cartridge strip 200 and is carried by a carrier strip 210. This is implemented by it being held in a cartridge holder 220 of the carrier strip 210 in such a manner that the cartridge 170 can open in the opening direction 180 when the fuel is ignited. For this purpose, the cartridge holder 220 is open to the combustion chamber 160 in the opening direction 180. The cartridge strip 200 is transported in the longitudinal direction of the carrier strip 210 by a strip passage (not shown in further detail) of the driving apparatus 100, which defines a transport direction 230. The strip passage opens into the receiving chamber 130, such that the cartridges 170 can be successively placed in the receiving chamber 130 and ignited.

The driving apparatus 100 furthermore comprises a closure 190, which is shown in FIG. 1 in a closed position, which corresponds to a driving-ready position of the driving apparatus 100. In the closed position, the closure 190 bounds the receiving chamber 130 opposite the opening direction 180. Particularly, the closure 190 clamps the cartridge 170 and/or the carrier strip 210 between itself and the cartridge holder 120 in such a manner that the cartridge 170 is chambered in the receiving chamber 130 and only opens in the opening direction 180 when the fuel is ignited. This is facilitated by the fact that the cartridge 170 has a predetermined breaking point 175 on its end facing the opening direction 180, preferably formed by an interruption of the cartridge wall 171. In addition, the cartridge has a cartridge base 174 on its end facing away from the opening direction, and laterally thereto has a particularly annular projection 172, which is preferably formed by a fold 173 of the cartridge wall 171.

The closure 190 has a firing pin guide 191, which opens into the receiving chamber 130 on the side of the receiving chamber 130 opposite the opening direction, such that a firing pin (not shown) for firing the cartridge 170 arranged in the receiving chamber 130 can move toward the receiving chamber 130 in such a manner that the firing pin strikes the cartridge base 174 and ignites the fuel, particularly via a firing charge arranged in the cartridge 170. The firing charge is preferably arranged on an edge of the cartridge base 174, and more preferably in the fold 173, and is ignited by compression, for example. The cartridge 170 is thus preferably designed as a rimfire cartridge. For transporting the cartridge strip 200, the cartridge holder 120 and the closure 190 are moved away from each other in the opening direction far enough so that the cartridge strip 200 with the cartridges can be moved in the transport direction 230 through and between the cartridge holder 120 and the closure 190. The transport of the cartridge strip 200 is accomplished by means of a contact sensor (not shown), particularly a transport pawl, which is actuated when the driving apparatus 100 is pressed against the substrate and/or when a driving operation is completed. According to an advantageous embodiment, the transport pawl is actuated by the recoil caused by the driving operation, after the driving operation has ended. According to a further advantageous embodiment, a contact spring is stressed when the driving apparatus is pressed against a substrate, and is released when lifted from the substrate, and particularly advantageously accomplishes or facilitates the transport of the cartridge strip.

In the closed position of the closure 190, shown in FIG. 1, the cartridge 170 is supported transversely to the opening direction 180 in the region of the receiving chamber 130 by the cartridge holder 120—specifically, in some sections, directly by direct contact between the cartridge 170 and the cartridge holder 120, and in some sections indirectly via a strip extension 240 of the carrier strip 210 arranged particularly circumferentially around the cartridge 170. In order to ensure in the remaining area of the cartridge 170, particularly at the height of the carrier strip 210, a support of the cartridge 170 transversely to the opening direction 180, several measures described below are possible, wherein the measures individually or in any combination, according to circumstances, contribute to an improved support of the cartridge. In particular, if the carrier strip 210 is made of plastic, the carrier strip 210 alone may not provide sufficient support of the cartridge 170.

The closure 190 has a support projection 195 which, at least in the closed position of the closure 190, engages in a rear-side strip recess 250 provided on the carrier strip 210. Preferably, the support projection 195 has a support surface 196 which is particularly preferably aligned parallel to the opening direction 180, specifically for supporting the cartridge 170 perpendicular to the opening direction 180. In embodiments which are not illustrated, the support surface has the shape of a particularly preferably completely annular truncated cone. The rear-side strip recess 250 has a supporting surface 260 corresponding to the support surface 196, which optionally is also aligned parallel to the opening direction 180 and rests against the support surface 196, in the closed position of the closure 190. Between the rear-side strip recess 250 and the cartridge holder 220, the carrier strip 210 has a ridge 270, via which the cartridge 170, particularly in the region of the fold 173 and/or the cartridge base 174 is supported transversely to the opening direction 180 indirectly on the closure 190, particularly on its support projection 195. The ridge 270 has, transverse to the opening direction 180, a thickness of less than 1 mm, preferably less than 0.5 mm, particularly preferably less than 0.3 mm, and is aligned in the transport direction 230 with the cartridge base 174. In the opening direction 180, the ridge 270 has a height of at least 0.5 mm, preferably at least 1 mm, particularly preferably at least 1.5 mm or at least 2 mm.

The rear-side strip recess 250 is formed as a depression or as a drop, and is thus arranged only on the back of the carrier strip 210. In embodiments which are not illustrated, the rear-side strip recess is formed as a passage, extending up to a front side of the carrier strip. In further embodiments which are not shown, the closure has no such support projection, such that the rear-side strip recess of the carrier strip is omitted.

Furthermore, the cartridge holder 120 has a cartridge holder projection 125, which extends the cartridge holder 130 opposite the opening direction 180, such that the cartridge 170 is supported perpendicular to the opening direction over a large area of its length measured in the opening direction. The carrier strip 210 has a depression 280 corresponding to the cartridge holder projection 125, into which the cartridge holder projection engages 125, in the closed position of the closure 190, to support the cartridge 170. The cartridge holder projection 125 fills in the depression 280 completely, such that an undesirable deformation of the carrier strip is made more difficult 210. The carrier strip 210 has a separating ridge 290 between the depressions 280 of each pair of directly adjacent cartridges 170. According to a preferred embodiment, the cartridge holder engages into the depression of the cartridge strip when the cartridge is arranged in the receiving chamber. Preferably, the cartridge holder completely fills the space of the depression of the cartridge strip when the cartridge is arranged in the receiving chamber.

As is apparent from FIG. 1, the cartridge 170 is supported on the closure transverse to the opening direction 180 and in the transport direction 230 by means of the support projection 195 and the rear-side strip recess 250. Preferably, the cartridge holder projection 125, the front-side strip depression 280, the reinforcing ridge 290, the support projection 195, the rear-side strip recess 250, the support surface 196, the supporting surface 260 and/or the ridge 270 extend along a whole depth of the cartridge 170 measured in a direction perpendicular to the opening direction 180 and perpendicular to the transport direction 230, such that the cartridge 170 is supported over its entire depth by the closure 190.

In addition, the cartridge holder projection 125, the front-side strip depression 280, the reinforcing ridge 290, the support projection 195, the rear-side strip recess 250, the support surface 196, the supporting surface 260 and/or the ridge 270 are also arranged outside of the drawing plane of FIG. 1, in front of or behind the cartridge 170, particularly the cartridge base 174, such that the cartridge 170 is also supported perpendicular to the opening direction 180 and perpendicular to the transport direction 230 by the closure 190. In particular, the cartridge holder projection 125, the front-side strip depression 280, the reinforcing ridge 290, the support projection 195, the rear-side strip recess 250, the support surface 196, the supporting surface 260 and/or the ridge 270 extend along an entire width of the cartridge 170 measured in the transport direction 230, such that the cartridge 170 is supported by the closure 190 over its entire width. Preferably, the cartridge holder projection 125, the front-side strip depression 280, the reinforcing ridge 290, the support projection 195, the rear-side strip recess 250, the support surface 196, the supporting surface 260 and/or the ridge 270 are arranged in an annular shape, and particularly a circular shape, in a plane transverse to the opening direction 180, particularly perpendicular to the opening direction 180, around the circumference of the cartridge 170, particularly the cartridge base 174. The cartridge 170 is then supported by the closure 190, particularly in the region of the cartridge base 174, in all directions perpendicular to the opening direction 180.

Figure 2:
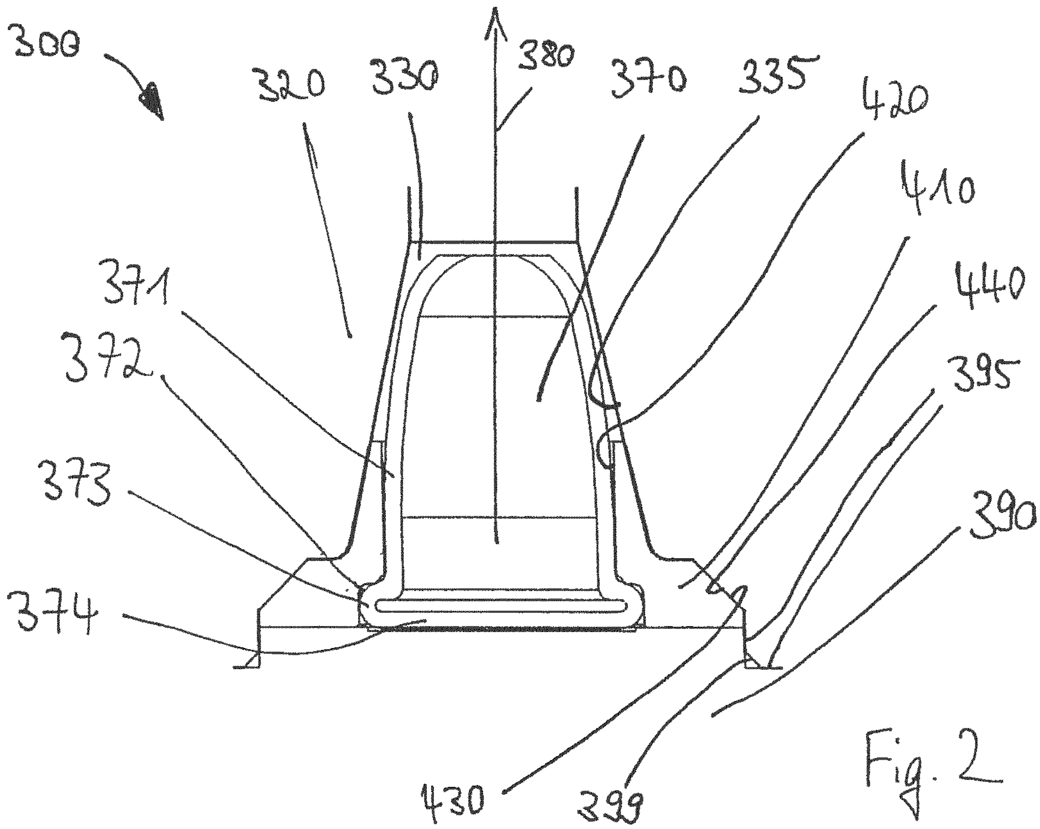
FIG. 2 shows a part of a driving apparatus in a cross-section.

FIG. 2 illustrates a section of a driving apparatus 300 used for driving fastening elements (not shown) into a substrate (not shown), in cross-section. The driving apparatus 300 comprises a cartridge holder 320, with a receiving chamber 330 for a cartridge 370. The cartridge 370 is received in the receiving chamber 330, and preferably lies against a wall section 335 of a recess of the cartridge holder 320 which forms the receiving chamber 330. The wall section 335 has the shape of a funnel or truncated cone which tapers to a combustion chamber (not shown), wherein the receiving chamber 330 is open in an opening direction 380. The cartridge 370 has, on its end facing opposite the opening direction 380, a cartridge base 374, and laterally thereto a particularly annular projection 372 around the circumference thereof, which is preferably formed by a fold 373 of a cartridge wall 371.

The cartridge 370 is a part of a cartridge strip, and is carried by a carrier strip 410 of the cartridge strip. This is implemented by it being held in a cartridge holder 420 of the carrier strip 410, formed by an annular ridge 425, in such a manner that the cartridge 370 can open in the opening direction 380 when the fuel in the cartridge 370 is ignited. The cartridge holder 420 is open in the opening direction 380 to a combustion chamber (not shown) for this purpose.

The cartridge strip is transported in the longitudinal direction of the carrier strip 410 by a strip passage (not shown) of the driving apparatus 300, which defines a transport direction oriented perpendicular to the drawing plane. The strip passage in this case opens into the receiving chamber 330, such that the cartridges 370 can be placed in succession in the receiving chamber 330 and ignited. The carrier strip 410 is made of a plastic. The cartridge wall 371 is made of an alloy. The cartridge holder 320 and the closure 390 are also made of alloys.

The driving apparatus 300 furthermore comprises a closure 390, which is shown in FIG. 2 in a closed position, which corresponds to a driving-ready position of the driving apparatus 300. In the closed position, the closure 390 projects into the recess of the cartridge holder 320 which forms the receiving chamber 330, and thereby bounds the receiving chamber 330 opposite the opening direction 380. Particularly, the closure 390 clamps the cartridge 370 and/or the carrier strip 410 between itself and the cartridge holder 320 in such a manner that the cartridge 370 is chambered in the receiving chamber 330 and only opens in the opening direction 380 when the fuel is ignited. The closure 390 in this case rests against contact faces 395 on the cartridge holder 320, such that the receiving chamber 330 is only open toward the combustion chamber and the strip passage, and is otherwise surrounded by the cartridge holder 320 and the closure 390. This enables better tightness against combustion gases or contamination, according to the circumstances. The first of the contact surfaces 395 in this case is oriented parallel to the opening direction 380, preferably in a cylindrical, particularly preferably circular cylindrical, configuration, wherein a second is preferably flat and oriented perpendicularly to the opening direction 380.

The cartridge strip with the cartridge 370 and the carrier strip 410 completely fills in the receiving chamber 330, such that the cartridge 370 is supported on all sides by the cartridge holder 320 and the closure 390, except toward the combustion chamber (not shown) in the opening direction. However, this necessitates insertion of the cartridge strip into the recess 330 of the cartridge holder 320 which forms the receiving chamber. In order to enable this insertion of the cartridge strip, the carrier strip 410 has a tapered insertion surface 430 on its front side facing the opening direction 480, which also results in a saving of material, under certain circumstances. The cartridge holder 320 has a chamfer 440 as a counter contour for the tapered insertion surface 430. The tapered insertion surface 430 and the chamfer 440 are frustoconical in shape and extend up to the first of the contact surfaces 395 on the outer edge of the receiving chamber 330, and thus also up to the edge of the carrier strip 410 and/or the cartridge strip. Said insertion is also facilitated by a recess of the cartridge holder 320, said recess forming a heel 399 on the edge of the receiving chamber 330.

In the cross-section shown in FIG. 2, the tapered insertion surface 430 and the chamfer 440 have a straight contour. In embodiments which are not illustrated, the tapered insertion surface has a curved—for example, convex or concave—contour in the corresponding cross-section. The chamfer then advantageously has a correspondingly curved—for example, concave or convex—contour.

Figure 3:
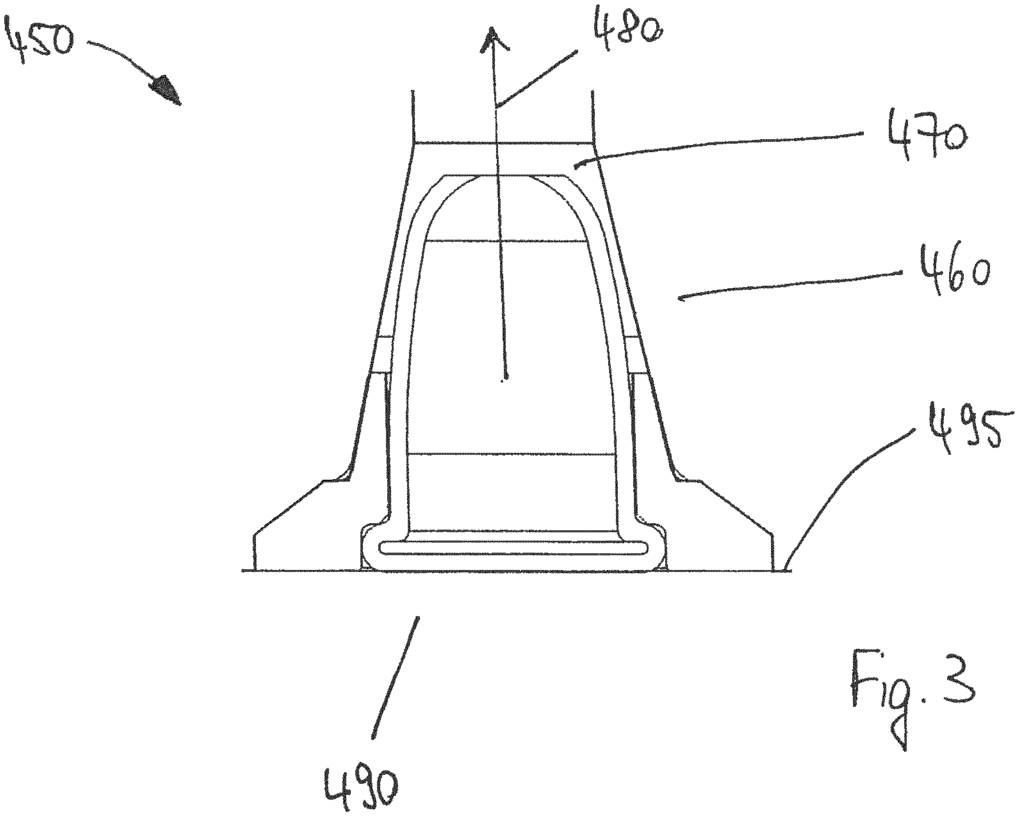
FIG. 3 shows a part of a driving apparatus in a cross-section.

FIG. 3 illustrates a section of a driving apparatus 450 shown in cross-section, which particularly differs from the driving apparatus 300 shown in FIG. 2 in that the closure 490 does not project into the recess of the cartridge holder 460 which forms the receiving chamber 470 when in its closed position. As a result, the closure 490 only contacts a flat contact surface 495 on the cartridge holder 460 which is oriented perpendicular to the opening direction 480.

Figure 4:
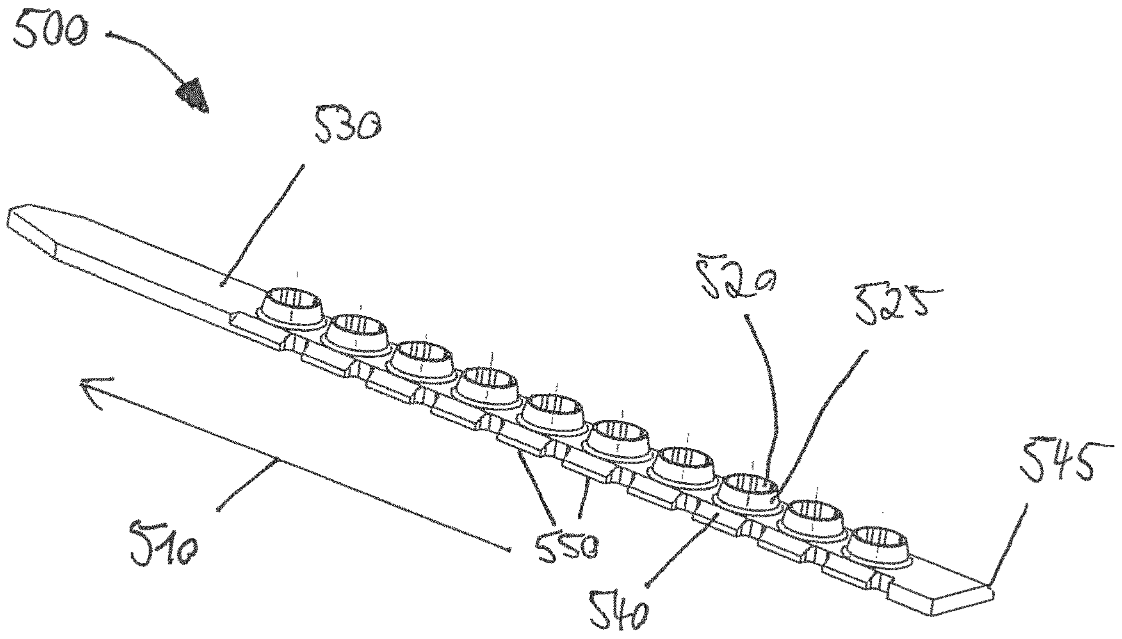
FIG. 4 shows a carrier strip.
Figure 5:
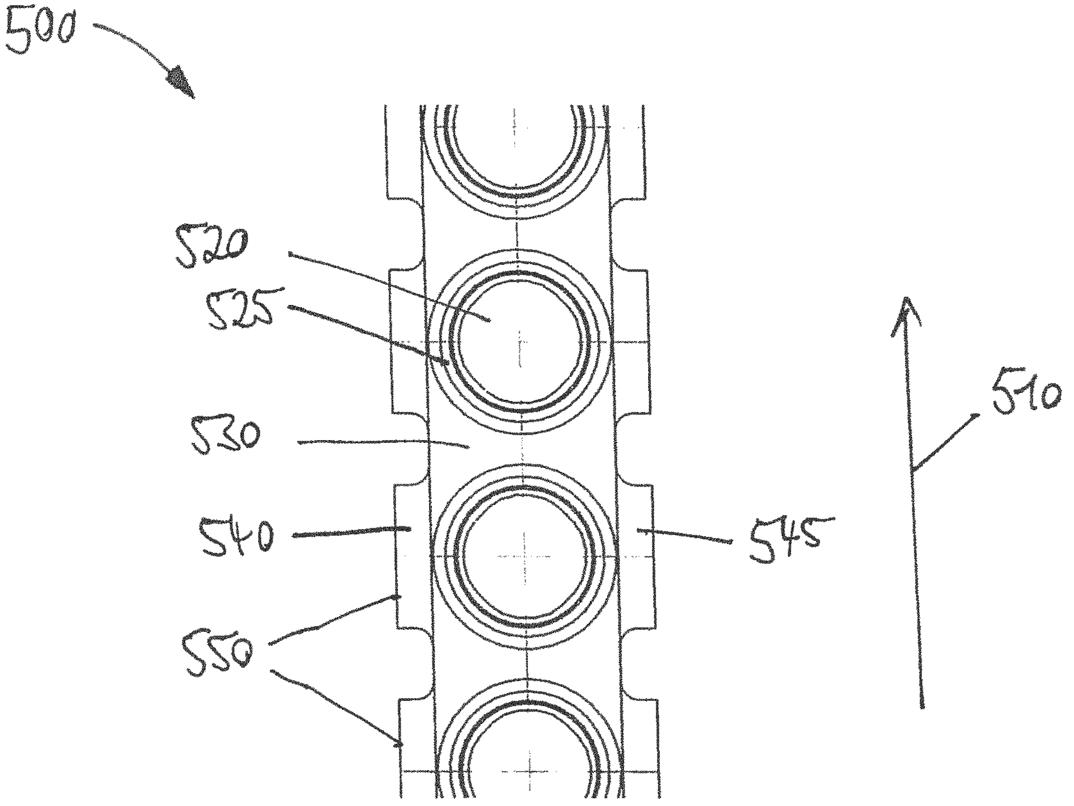
FIG. 5 shows a part of a carrier strip.

FIGS. 4 and 5 illustrate a carrier strip 500 made of plastic, which forms a cartridge strip together with cartridges which are not shown. The carrier strip 500 defines a transport direction 510 with its elongated shape. Cartridge holders 520 designed as passages, each surrounded by an annular ridge 525, are arranged one after the other along the transport direction 510. A cartridge (not shown) is held in each of the cartridge holders 520.

The carrier strip 500 has a front side 530 from which the ridges 525 project in an opening direction 525. On its edge, the support strip 500 has, on its front side, a tapered insertion surface 540. The tapered insertion surface 540 is arranged on transport projections 550 and extends there up to the outermost edge of the carrier strip 500 and/or the cartridge strip. The transport projections 550 allow the engagement of a transport pawl of a driving apparatus which the cartridge strip can be inserted into. A tapered insertion surface 545 is also included on the opposite edge. In embodiments which are not illustrated, the opposite edge does not have a tapered insertion surface, such that the cartridge strip can only be inserted into a driving apparatus in the correct orientation.

Figure 6:
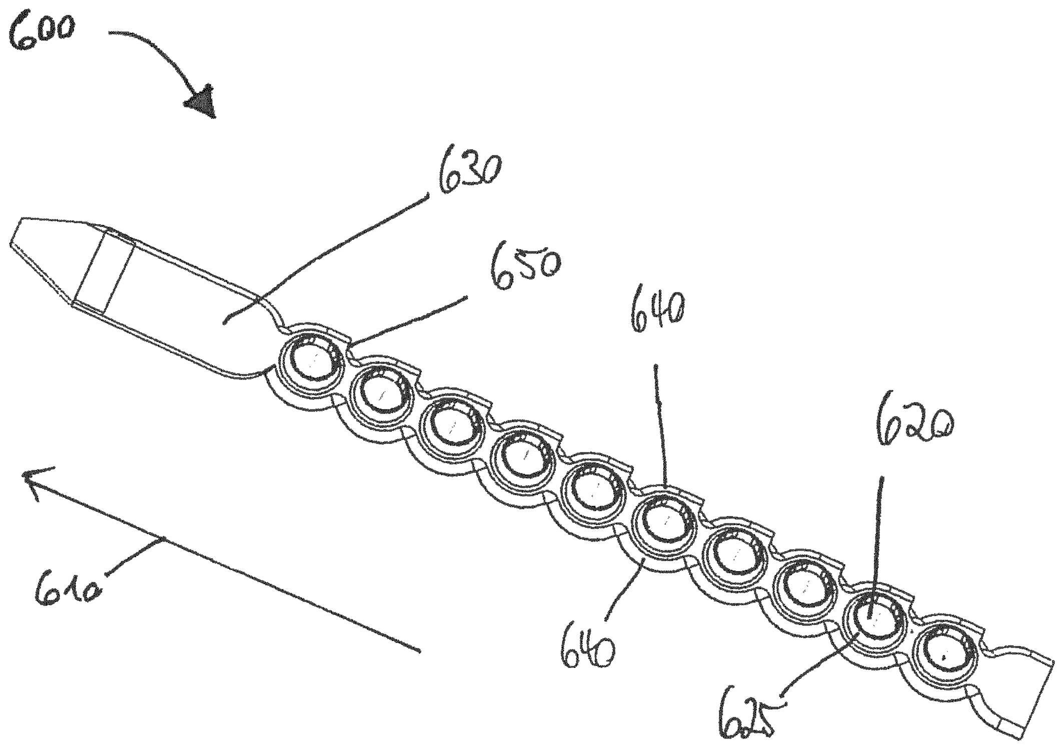
FIG. 6 shows a carrier strip.
Figure 7:
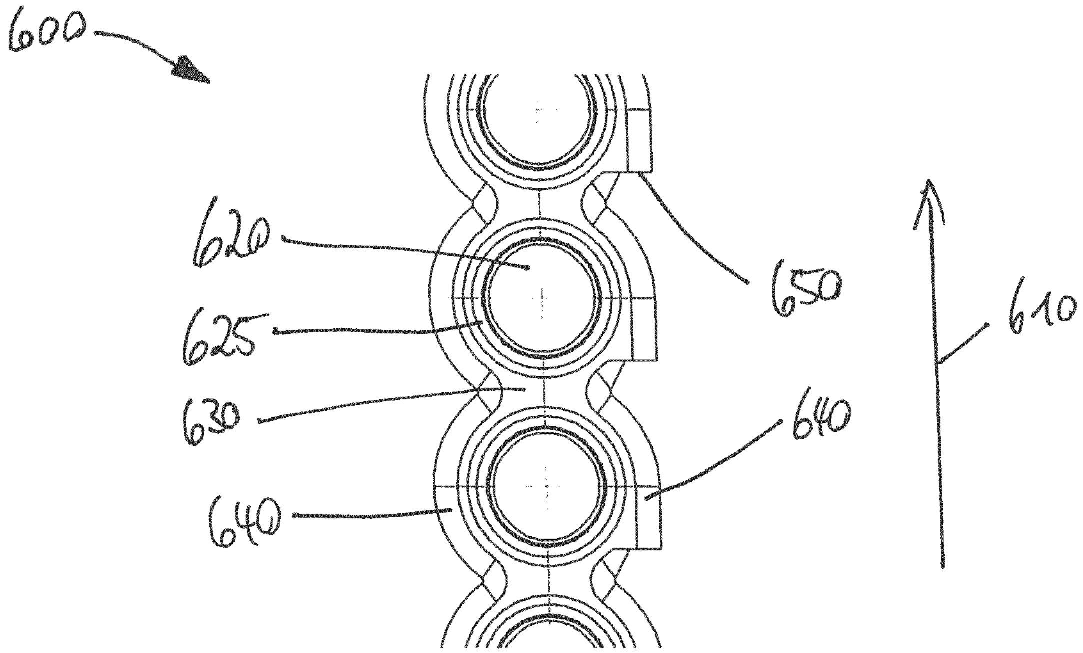
FIG. 7 shows a part of a carrier strip.

FIGS. 6 and 7 illustrate a further carrier strip 600 made of plastic, which forms a cartridge strip together with cartridges (non-shown). The carrier strip 600 defines a transport direction 610 with its elongated shape. Cartridge holders 620 designed as passages, each surrounded by an annular ridge 625, are arranged one after the other along the transport direction 610. A cartridge (not shown) is held in each of the cartridge holders 620. The ridges 625 project in an opening direction from a front side 630 of the carrier strip 600. On its lateral edges with respect to the transport direction 610, the carrier strip has, on the front side 630, a tapered insertion surface 640. Each of the tapered insertion surfaces 540 extends up to the outermost edge of the carrier strip 600 and/or the cartridge strip.

A strip section of the carrier strip with a partially circular periphery, and preferably frustoconical contour, as seen in the opening direction, is functionally assigned to each cartridge and/or cartridge holder 620. A receiving chamber of a driving apparatus (not shown), into which the cartridge strip is inserted, has a partially circular periphery at the height of the chamfer and/or at the height of its boundary effected by a closure of the driving apparatus, such that the cartridge can be fully chambered, in a closed position of the closure, in the receiving chamber. When the cartridges are fired, a pressure propagates radially in the material of the carrier strip 600. This radial pressure is received in an improved manner due to the partial circular chambering.

Each strip section which is functionally assigned to a cartridge has a transport projection 650 which projects perpendicularly to the opening direction beyond the rest of the circular shape of the strip section, and which allows the engagement of a transport pawl of a driving apparatus into which the cartridge strip can be inserted. Because of the asymmetric shape of the transport projections 650 with respect to the circular shape of each associated strip section, the transport pawl of the driving apparatus can slide gently over the circular shape of the subsequent strip section upon its return movement after transporting the cartridge strip. The transport projections 650 do not project perpendicular to the transport device 610 beyond the rest of the circular shape of the respective strip section, which enables a narrow strip and saves space. The tapered insertion surface 640 extends up to the transport projection 650. In embodiments which are not illustrated, the tapered insertion surface on each strip section is circular in shape, such that it also continues between two cartridge holders in each case.

Figure 8:
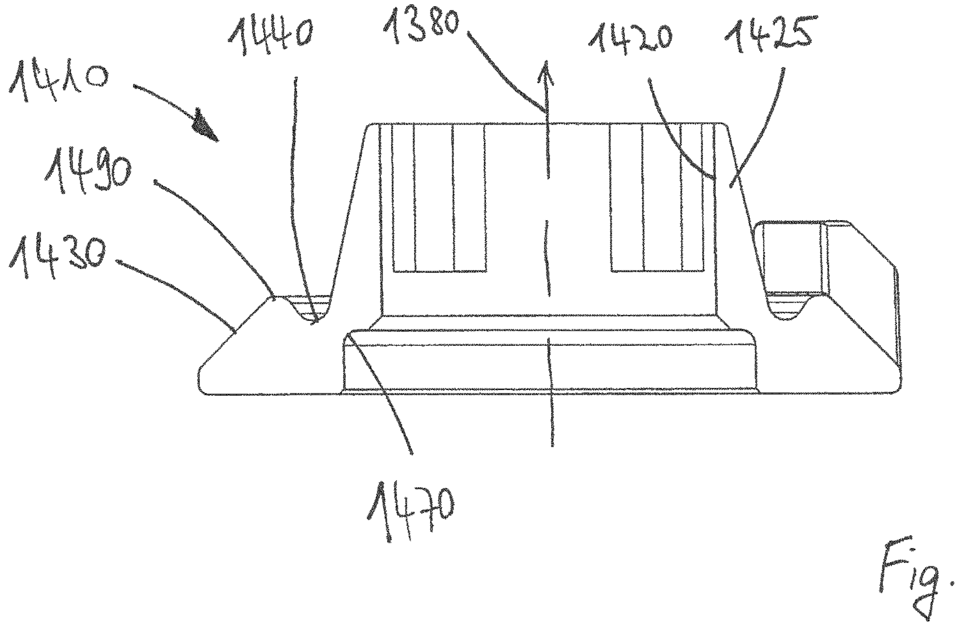
FIG. 8 shows a part of a carrier strip in a cross-section.

FIG. 8 illustrates a cross-section of a carrier strip 1410 of a cartridge strip. A ridge 1425 which runs around the circumference of an opening direction 1380 forms a cartridge holder 1420 of the carrier strip 1410, in which a cartridge (not shown) can be held in such a manner that the cartridge can open in the opening direction 1380 when a fuel in the cartridge is ignited. The cartridge holder 1420 is open in the opening direction 1380 toward a combustion chamber (not shown) of a driving apparatus for this purpose. The cartridge strip is transported in the longitudinal direction of the carrier strip 1410 through a strip passage (not shown) of the driving apparatus which defines a transport direction oriented perpendicular to the drawing plane. The carrier strip 1410 is made of a plastic.

In order to enable or facilitate insertion of the cartridge strip into a receiving chamber of the driving apparatus, the carrier strip 1410 has, on its front side facing the opening direction 1380, a tapered insertion surface 1430—which also results in a saving of material under certain circumstances. The tapered insertion surface 1430 is frustoconical in shape and extends up to the edge of the carrier strip 1410 and/or of the cartridge strip.

The carrier strip 1410 has, on its front side facing the opening direction 1380, a depression 1440 which runs around the cartridge holder 1420 and completely surrounds the cartridge holder 1420, particularly designed as a circular, annular groove. Projected onto a central axis of the cartridge holder 1420, running in the opening direction 1380, the depression 1440 is sufficient, and thus also a cartridge holder, of a driving apparatus, which engages into the depression 1440, up to a cartridge base of the cartridge (not shown). As a result, the cartridge holder contributes to supporting the cartridge base in all directions perpendicular to the opening direction. To receive a circumferential projection of the cartridge base, the cartridge holder 1420 likewise has a circumferential recess 1470. A preferably likewise-circumferential projection 1490 extends further into the opening direction 1380 than the depression 1440, and facilitates, according to circumstances, a material flow in the circumferential direction during the manufacture of the carrier strip 1410 by means of injection molding, whereas the depression 1440 inhibits a material flow in the radial direction away from the cartridge base during the ignition of the cartridge.

Figure 9:
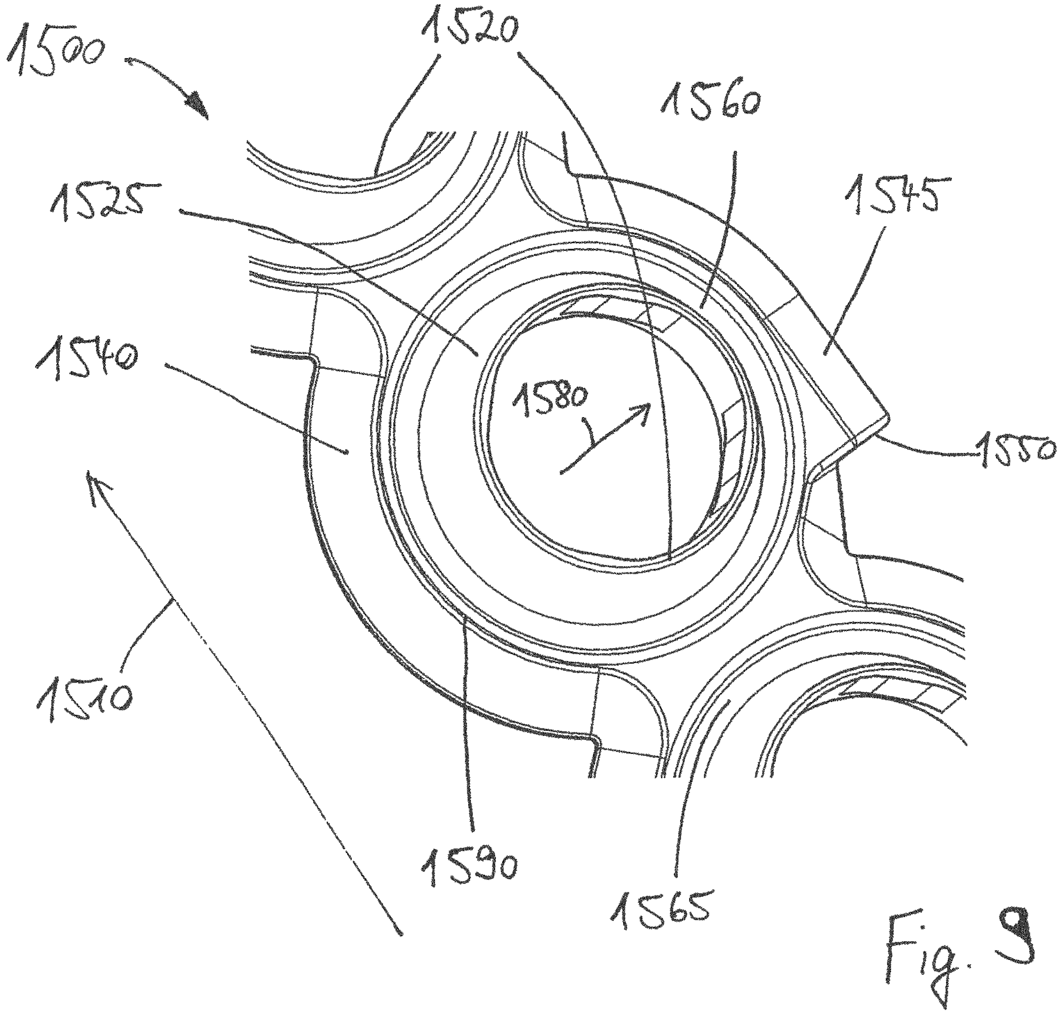
FIG. 9 shows a part of a carrier strip.

FIG. 9 partially illustrates a carrier strip 1500 made of plastic, which forms a cartridge strip together with cartridges which are not shown. The carrier strip 1500 defines a transport direction 1510 with its elongated shape. Cartridge holders 1520 designed as passages, each surrounded by an annular ridge 1525, are arranged one after the other along the transport direction 1510, wherein the ridges 1525 project from a front side of the carrier strip 1500 which faces into the opening direction 1580. The opening direction 1580 in this case is oriented obliquely exiting the drawing plane. One cartridge (not shown) is held in each of the cartridge holders 1520.

On its edge, the support strip 1500 has, on its front side, a tapered insertion surface 1545. The chamfer 1545 is arranged on transport projections 1550, and extends there up to the outermost edge of the carrier strip 1500 and/or cartridge strip. The transport projections 1550 facilitate the engagement of a transport pawl of a driving apparatus in which the cartridge strip can be inserted. A tapered insertion surface 1540 is likewise included on the opposite edge. In embodiments which are not illustrated, the opposite edge does not have a tapered insertion surface, such that the cartridge strip can only be inserted into a driving apparatus in the correct orientation.

Because of the asymmetric shape of the transport projections 1550 with respect to the circular shape of each associated strip section, the transport pawl of the driving apparatus can slide gently over the circular shape of the subsequent strip section upon its return movement after transporting the cartridge strip. The transport projections 1550 do not project perpendicular to the transport device 1510 beyond the rest of the circular shape of the respective strip section, which enables a narrow strip and saves space. In embodiments which are not illustrated, the tapered insertion surface on each strip section is annular, such that it continues between two cartridge holders.

A strip section of the carrier strip with a partially circular periphery, and preferably frustoconical contour, as seen in the opening direction, is functionally assigned to each cartridge and/or cartridge holder 1520. A receiving chamber of a driving apparatus (not shown), into which the cartridge strip is inserted, has a partially circular periphery at the height of the chamfer and/or at the height of its boundary effected by a closure of the driving apparatus, such that the cartridge can be fully chambered, in a closed position of the closure, in the receiving chamber. When the cartridges are fired, a pressure propagates radially in the material of the carrier strip 1500. This radial pressure is received in an improved manner due to the partial circular chambering.

The carrier strip 1500 has, on its front side facing into the opening direction 1580, depressions 1560, 1565, each of which runs around the cartridge holder 1520 and completely surrounds the cartridge holder 1520, particularly designed as circular, annular grooves. A likewise circumferential projection 1590 forms a separating ridge 1600 which separates two mutually adjacent depressions 1560, 1565 from each other.

The present invention has been illustrated using the example of a driving apparatus for fastening elements. It is noted, however, that the apparatus according to the invention is also suitable for other applications. Furthermore, the described features of the individual embodiments can be arbitrarily combined within a single embodiment, if they are not mutually exclusive.

The invention claimed is:

1. A cartridge strip for use in a driving apparatus, the cartridge strip having a cartridge holder carrying a cartridge containing a fuel, wherein the cartridge strip moves in a transport direction through the driving apparatus, wherein the-cartridge can open in a direction facing a driving element in the driving apparatus when the fuel is ignited, and wherein the cartridge strip has a tapered insertion surface on a front side of the cartridge strip which faces into the direction facing the driving element, and the tapered insertion surface extends perpendicular to the direction facing the driving element, up to an outer side edge of the front side of the cartridge strip.

2. The cartridge strip according to claim 1, including a strip section which is functionally assigned to the cartridge and which has a circular circumference as seen in the direction facing the driving element.

3. The cartridge strip according to claim 1, wherein the tapered insertion surface is annular.

4. The cartridge strip according to claim 1, wherein the cartridge strip comprises a ridge which encloses the cartridge holder, the cartridge holder having, on its outer side facing away from the cartridge, an additional tapered insertion surface remote from the tapered insertion surface.

5. The cartridge strip according to claim 1, wherein the cartridge strip has, on the front side facing into the direction facing the driving element, an annular depression which runs around the cartridge holder and which completely surrounds the cartridge holder.

6. The cartridge strip according to claim 5, wherein the annular depression is a groove.

7. The cartridge strip according to claim 3, wherein the tapered insertion surface is frustroconical.

8. The cartridge strip according to claim 4, wherein the additional tapered insertion surface remote from the tapered insertion surface is cone-shaped.

9. The cartridge strip according to claim 6, wherein the groove is over an entire circumference around the cartridge holder.

* * * * *